No. 725,388. PATENTED APR. 14, 1903.
E. S. WOODS.
ROLLER SIDE BEARING FOR CAR TRUCKS.
APPLICATION FILED SEPT. 2, 1902.
NO MODEL. 2 SHEETS—SHEET 1.

Witnesses:
Carl D. Crawford
William L. Hall

Inventor:
Edwin S. Woods
by Poole & Brown
his Attorneys

No. 725,388. PATENTED APR. 14, 1903.
E. S. WOODS.
ROLLER SIDE BEARING FOR CAR TRUCKS.
APPLICATION FILED SEPT. 2, 1902.
NO MODEL. 2 SHEETS—SHEET 2.
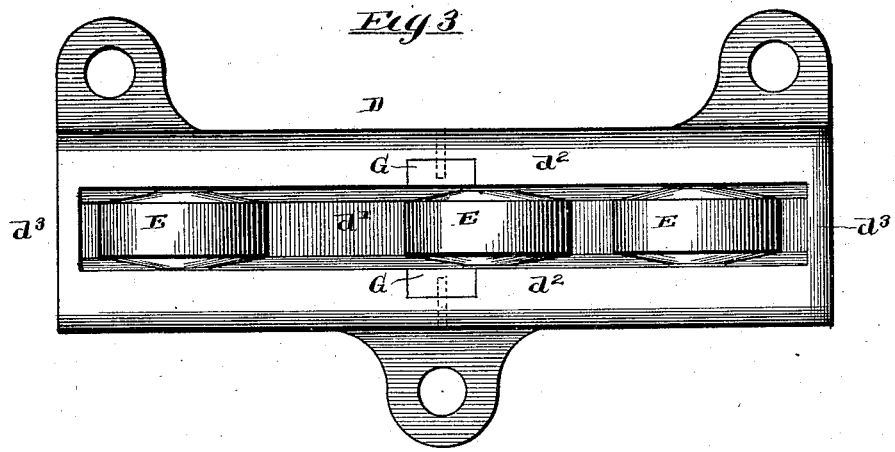
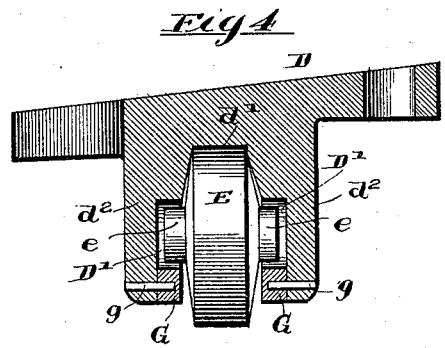
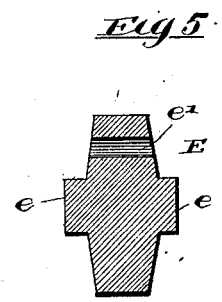
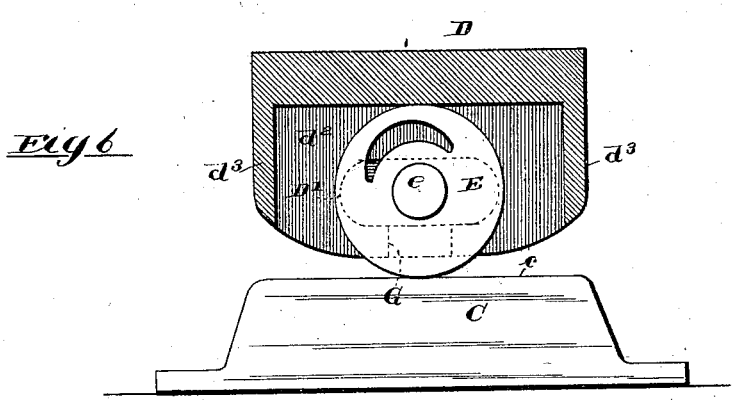
Witnesses:—
Carl H. Crawford
William L. Hall
Inventor:—
Edwin S. Woods
by Poole & Brown
his Attorneys

UNITED STATES PATENT OFFICE.

EDWIN S. WOODS, OF CHICAGO, ILLINOIS, ASSIGNOR OF ONE-HALF TO SAMUEL WORTHINGTON McMUNN, OF CHICAGO, ILLINOIS.

ROLLER SIDE BEARING FOR CAR-TRUCKS.

SPECIFICATION forming part of Letters Patent No. 725,388, dated April 14, 1903.

Application filed September 2, 1902. Serial No. 121,716. (No model.)

*To all whom it may concern:*

Be it known that I, EDWIN S. WOODS, of Chicago, in the county of Cook and State of Illinois, have invented certain new and useful Improvements in Roller Side Bearings for Car-Trucks; and I do hereby declare that the following is a full, clear, and exact description thereof, reference being had to the accompanying drawings, and to the letters of reference marked thereon, which form a part of this specification.

This invention relates to improvements in roller side bearings for railway-cars; and the invention consists in the matters hereinafter set forth, and more particularly pointed out in the appended claims.

Figure 1:
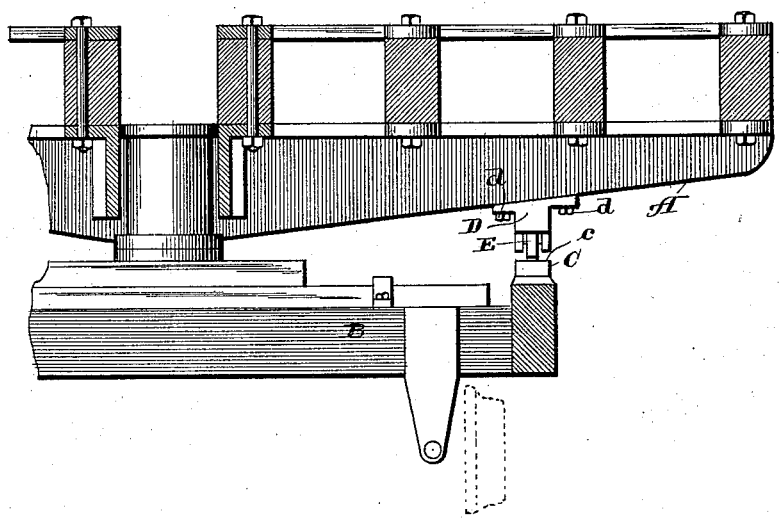
Figure 2:
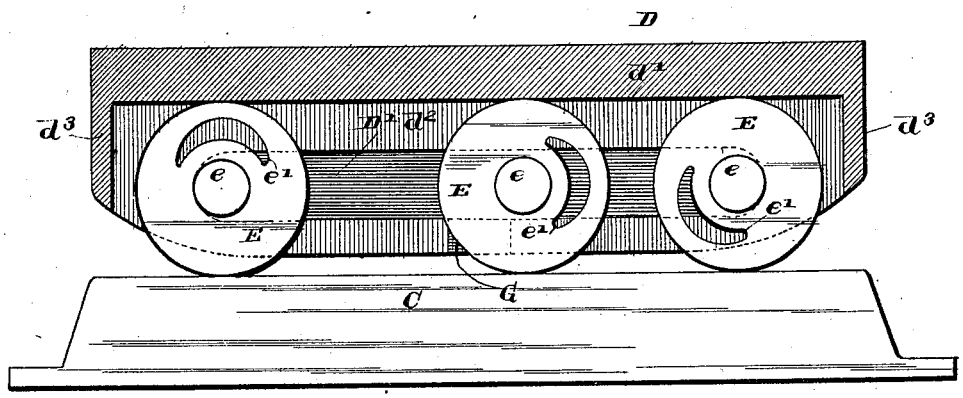

In the drawings, Figure 1 illustrates the manner of applying my invention to the car and truck bolster of a railway-car. Fig. 2 is a longitudinal vertical section of the upper bearing member and rollers, showing the lower bearing member in side elevation. Fig. 3 is a bottom plan view of the upper bearing member. Fig. 4 is a cross-section thereof. Fig. 5 is an axial section of one of the rollers. Fig. 6 is a view, partly in longitudinal vertical section and partly in side elevation, of a modified form of bearing.

In said drawings, A represents a portion of the body-bolster of a car, and B the corresponding part of the truck. Said truck is provided with a bearing member or plate C, having an upwardly-facing bearing-surface $c$ and is attached to the upper side of the truck-bolster. Vertically above said bearing-plate and attached to the under side of the body-bolster by bolts $d$ is a bearing member or plate D, having a downwardly-facing bearing-surface $d'$.

E E designate a plurality of rollers, which are adapted for peripheral rolling engagement with said upper and lower bearing-surfaces and through which a portion of the weight of the car is transmitted to the truck. A complete equipment of the side bearings for a car consists of one set of bearings on each side of each truck or four bearings for each car, thereby constituting, in connection with the center plates, six points of support for each car.

The upper bearing members or plates D D, as herein shown, have the form of casings, which receive the bearing-rollers E, each of said members being provided with side parts or parallel vertical flanges $d^2 d^2$, which may be connected by end parts or flanges $d^3 d^3$. The rollers E rotate on horizontal axes normally perpendicular to the planes of said side flanges. The side flanges are provided on their inner faces with longitudinal ways or channels D' D', and the rollers E are provided with oppositely-extending trunnions $e$, which extend into said channels and have guiding engagement therewith. Said channels are of sufficient depth to give clearance beyond the ends of the trunnions and are of greater width than the trunnion diameters. The lower walls of said channels are straight and horizontal and constitute bearing-surfaces for the trunnions when the peripheries of the rollers are free from the coacting bearing-surfaces.

The radii of the rollers and the distance between the center lines of the channels D' and the upper bearing-surfaces are so proportioned that when the peripheries of the rollers are in contact with the upper and lower bearing-surfaces the trunnions $e$ are out of contact with the lower walls of said channels, so that the weight of the bolster and the parts carried thereby is transmitted to the bearing member C directly through the larger parts of the rollers and without bringing stress upon the trunnions. When the upper and lower bearing-surfaces are separated, the rollers drop down with their trunnions engaged with the lower walls of the channels D', so that said rollers are at this time supported on the trunnions. Preferably said rollers are so mounted that when released from the upper and lower bearing-surfaces they may shift their peripheral points of contact with respect to said bearing-surfaces. For this purpose said rollers are eccentrically loaded, so that upon being released from the upper and lower bearing-surfaces they tend to rotate relatively to said surfaces toward the center or ends of the surfaces, whereby at the next engagement of the surfaces with the roller peripheries new points of contact between said parts are presented. Such eccentric loading of the rollers is shown as effected by coring out the bodies of the rollers between the peripheries and the axes of rotation thereof to provide longitudinal openings $e'$, as shown in Figs. 2 and 5. Said cored-out openings are shown as made of crescent shape in cross-section. With this construction when either of the rollers is released from the upper and lower bearing-surfaces at a time when the cored-out portion thereof is located at either side of a vertical plane passed through the axis of rotation of the roller the heavier or eccentrically-loaded side of the roller will cause the roller to be rotated to bring it to rest, with the lighter side above its axis of rotation. In this way it is assured that when the rollers are released from the engagement with the upper and lower bearing-surfaces there will always be such movement of the rollers as to insure that all parts of the peripheries will be brought into bearing relation with respect to said upper and lower bearing-surfaces, with a result of uniform wear upon the rollers and bearing-plates. By reason of the contact of the bearing-surfaces with the roller peripheries in the greatest diameter thereof when load is transmitted to the truck therethrough and the engagement of the trunnions with the channels when the rollers are released from the bearing-surfaces it is assured that the succeeding engagement of each roller with the bearing-surfaces after the release of said roller will be a new point of engagement.

One advantage of the construction just described is that the roller or rollers do not tend to gravitate toward a given position in the path thereof and there stop, as when the lower walls of the channel are inclined, and the rollers do not tend, therefore, to produce undue wear upon certain parts of the bearing-surfaces, as when there is a tendency to localize the rollers in their path. On the other hand, owing to the straight paths in which the roller-trunnions travel when the rollers are free from their bearing-surfaces and to the free movement of the rollers governed by the eccentric loading thereof, said rollers (when a plurality thereof are employed for each channel) tend to spread throughout their path, and thereby have contact with all parts of the bearing-surfaces alike. Moreover, for the same reason the rollers do not tend to move in peripheral contact one with the other either during the time they are transmitting load from the car to the truck or at any other time such as would occur should the rollers tend to gravitate toward one part of their path when the peripheries thereof are released from the upper and lower bearing-plates. There is little or no tendency, therefore, for the rollers to wear against each other at the peripheries thereof or to impede the rolling action of the rollers by such peripheral contact when weight from the car is being transmitted to the truck therethrough. If desired, but one roller may be used for each channel, as shown in Fig. 6; but a plurality of rollers are preferred, inasmuch as they promote the stability of the parts.

The trunnion-channels $D'$ are of such length as to arrest the travel of the outer rollers before the peripheries of said rollers are brought into contact with end flanges of the casing when such end flanges are employed, the curved end walls of the channels constituting stops which engage the trunnions to arrest the travel of the rollers. This construction prevents peripheral contact between the surfaces of the rollers and the end flanges of the casing, which would obviously result in a greater impediment to the rotation of the rollers than would be caused by the frictional contact between the trunnions and the end surfaces of the channels.

In order to permit the insertion of the roller-trunnions in the channels $D'$, the side flanges $d^2$ are provided centrally thereof with upwardly-opening notches or grooves which intersect the channels. When the rollers are inserted in place, the trunnions thereof pass through said vertical notches, and the rollers are prevented from accidentally dropping out of place by means of suitable stop-blocks G, located across said openings and held in place therein by means of pins $g$, extending through the blocks and flanges in the manner clearly shown in Figs. 3 and 4.

In equipping a car with a set of side bearings made in accordance with my invention the rollers may be set originally in contact with the upper and lower bearing-surfaces and remain normally in contact therewith, or said rollers may be set to be normally out of contact with the upper and lower bearing-surfaces and to be brought into contact therewith when the car or truck is tilted, as when the car is passing around a curve. The former equipment is illustrated in the drawings. In the first-mentioned arrangement the car rides on the rollers until it strikes a curve, at which time the rollers of diagonally opposite bearings are released by reason of slight separation of the bearing-surfaces, the other two rollers being at this time in rolling contact with their bearing-surfaces and transmitting weight brought thereon to the truck. When said diagonally opposite rollers are released, the trunnions thereof fall upon the lower walls of the trunnion-channels $D'$, and by reason of the eccentric loading of the rollers said rollers shift until the greatest weight thereof is below their axes and are in position to present new points of contact to the bearing-surfaces when again engaged therewith.

In the second arrangement named the rollers are free to adjust themselves in their paths of movement when the car is on straight track; but when the car or truck tilts, as in passing around a curve, one or more of the bearings are brought into action to afford a roller-bearing between the trucks and car. When the car again passes to straight track, the rollers are freed from peripheral contact with the upper and lower bearing-surfaces and are again at liberty to adjust themselves, as will be determined by the eccentric loading of the rollers.

I do not wish to be limited to the specific structural details shown, except as hereinafter made the subject of specific claims. For instance, the ways for the roller-trunnions need not be true channels so long as the essential features of said ways set forth in the claims are preserved.

I claim as my invention—

1. A side bearing for railway-cars comprising upper and lower bearing members having normally parallel bearing-surfaces, one or more rollers adapted for rolling contact with said upper and lower bearing-surfaces, the upper member having side parts provided with channels and the roller or rollers being provided with trunnions which occupy said channels, said channels having straight lower walls, substantially parallel with the upper bearing-surface and the trunnions being out of contact with the lower walls of the channels when the roller or rollers have peripheral contact with said upper and lower bearing-surfaces, and adapted to rest and roll on the lower walls of the channels when said upper and lower bearing-surfaces are out of contact with the roller or rollers.

2. A side bearing for railway-cars comprising upper and lower bearing members having normally parallel bearing-surfaces, one or more eccentrically-loaded rollers adapted for rolling contact with said upper and lower bearing-surfaces, the upper member having side parts provided with channels, and the roller or rollers being provided with trunnions which occupy said channels, said trunnions being out of contact with the lower walls of the channels when the roller or rollers have peripheral contact with said upper and lower bearing-surfaces, and in contact with the lower walls of the channels when the upper and lower bearing-surfaces are out of peripheral contact with the roller or rollers.

3. A side bearing for railway-cars comprising upper and lower bearing members having normally parallel bearing-surfaces, one or more rollers adapted for rolling contact with said upper and lower bearing-surfaces, the upper member having side parts provided with channels and the roller or rollers being provided with trunnions which occupy said channels, said channels having straight lower walls, substantially parallel with the upper bearing-surface and the trunnions being out of contact with the lower walls of the channels when the roller or rollers have peripheral contact with said upper and lower bearing-surfaces, and adapted to rest and roll on the lower walls of the channels when said upper and lower bearing-surfaces are out of contact with the roller or rollers, the ends of said channels constituting stops which engage the roller-trunnions to arrest the bodily movement of the roller or rollers with respect to the bearing-surfaces.

4. A side bearing for railway-cars comprising upper and lower bearing members having normally parallel bearing-surfaces, one or more rollers adapted for rolling contact with said upper and lower bearing-surfaces, each roller being provided between its axis of rotation and its periphery with a cored-out recess, the upper member having side parts provided with channels, and the roller or rollers being provided with trunnions which occupy said channels, said trunnions being out of contact with the lower walls of the channels when the roller or rollers have peripheral contact with said upper and lower bearing-surfaces, and in contact with the lower walls of the channels when the upper and lower bearing-surfaces are out of peripheral contact with the roller or rollers.

In testimony that I claim the foregoing as my invention I affix my signature, in presence of two witnesses, this 19th day of August, A. D. 1902.

EDWIN S. WOODS.

Witnesses:
  WILLIAM L. HALL,
  GEORGE R. WILKINS.